Jan. 24, 1956     O. G. SCHWEDE     2,731,872
ANGULAR DISCRIMINATING OPTICAL DEVICE
Filed June 10, 1952     2 Sheets-Sheet 1

INVENTOR
OTTO G. SCHWEDE
BY
ATTORNEY

Jan. 24, 1956  O. G. SCHWEDE  2,731,872
ANGULAR DISCRIMINATING OPTICAL DEVICE
Filed June 10, 1952  2 Sheets-Sheet 2

INVENTOR
OTTO G. SCHWEDE
BY
ATTORNEY

United States Patent Office 2,731,872
Patented Jan. 24, 1956

2,731,872

ANGULAR DISCRIMINATING OPTICAL DEVICE

Otto G. Schwede, Ventura, Calif.

Application June 10, 1952, Serial No. 292,775

2 Claims. (Cl. 88—1)

(Granted under Title 35, U. S. Code (1952), sec. 266)

The invention described herein may be manufactured and used by or for the Government of the United States of America for governmental purposes without the payment of any royalties thereon or therefor.

This invention relates to novel glare protectors and is more particularly concerned with optical devices for reducing glare from lights or from the sun.

This application is a continuation-in-part of copending U. S. application Serial No. 115,306 of Otto G. Schwede, filed September 12, 1949.

In night driving it has been established that it is generally the scattered light rays of an approaching bright headlight which blind a driver. These light rays, when entering the eye, effect the visibility in two ways. First, the weak impressions due to useful reflections from objects ahead of the driver are greatly reduced or eliminated by the powerful direct light transmission from the approaching headlights. Second, the mechanism of the human eye automatically adjusts the pupil of the eye to the total incoming quantity of light, and consequently, an approaching powerful headlight causes automatic contraction of the pupil, which is normally wide open during the night, to a very small effective area, with an additional weakening of the useful light impressions as a result. The well known sensation which a blinded driver experiences is that of a black wall with two bright lights in it.

A similar but far weaker effect can be observed during the hours when the sun is near the horizon. The position of the sun, however, is not always directly ahead of the driver, so that he can often protect himself by means of a sun visor. But the principle of the sun visor cannot be applied to night driving because the source of light is almost directly ahead and at nearly the same level as the road, and hence use of a visor would thus eliminate from view a substantial portion of the road which must be observed. An opaque shade or light filter placed before the driver and capable of effective darkening of the disturbing headlights consequently would either darken the driver's own lane to a considerable degree or would not be effective at all.

Moreover, shielding a portion of the driver's field of vision with a screen or filter would have many disadvantageous features. First, a shade which affords a sharp separation between the left and right fields of vision would have to be placed at a great distance in front of the eyes due to the finite diameter of the pupil of the eye. In addition, two members, one extending from the nose, the other from the left temple to the screens would have to be provided. These members would narrow the useful field of vision and function like blinders. Second, the eyes of a driver would always be irritated by these supporting members brought directly into his field of vision. Increased inconvenience and insecurity would be the result.

Various devices have been proposed for reducing glare, particularly in night driving, including devices employing polarized light. However, the majority of such prior art devices have proven unsatisfactory in use.

One object of the invention is to provide new and improved glare protection devices.

Another object is the provision of optical devices for reducing glare from lights or from the sun.

Yet another object of the invention is to afford simple and relatively inexpensive glare reducing or eliminating optical devices which may be worn by a car driver like spectacles, or which may be attached to the windshield of a vehicle, or which may be incorporated in any suitable manner in front of the driver of a vehicle, and through which he may look while operating a car at night or against the sun.

Yet another aim of the invention is the provision of optical glare protecting devices arranged in conjunction with the headlights of a vehicle.

Other objects and many of the attendant advantages of this invention will be readily appreciated as the same becomes better understood by reference to the following detailed description when considered in connection with the accompanying drawings wherein.

Briefly, an optical device is provided, in accordance with the invention, comprising a transparent body having an entrance face, a second face and a third face, one of said second and third faces being a totally reflective surface disposed at such an angle to the entrance face that a portion of the light rays entering the entrance face is totally reflected and a portion of said rays is transmitted by said reflective surface depending on their angles of incidence, and an optical double layer contiguous to said second face and disposed in the path of at least a portion of the light rays emerging from said body, said double layer consisting of a light filter and a transparent lamina of low index of refraction adjacent to and in continuous contact with said filter. Means are generally also provided and positioned in relation to said transparent body for substantially restoring the rays transmitted therethrough to their original direction. The above transparent body is usually in the form of a glass prism or prism element.

The glare protector device of the invention, as applied particularly to night driving, provides a sharp separation between the light rays coming from one side of the road and the light rays coming from the other side, thus eliminating the glare from approaching headlights and retaining full visibility of the driver's lane.

Figure 1:
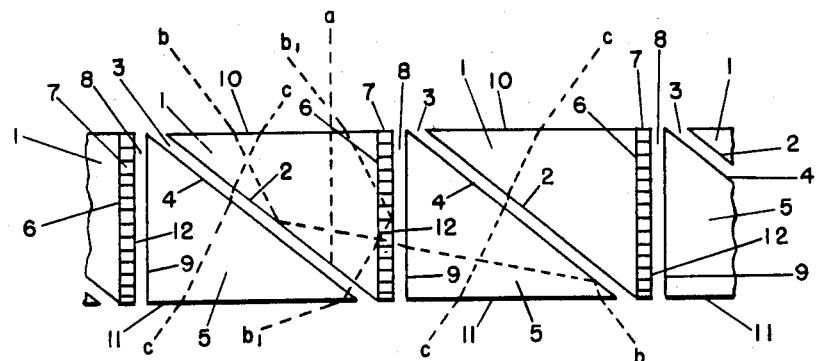
Fig. 1 is a schematic illustration of one embodiment of the invention.

Referring more particularly to Fig. 1, the underlying principle of the invention is explained in a simple manner. This figure is an enlarged horizontal sectional view of one embodiment of an optical device according to the invention for separation of light rays of different angles of incidence. This device consists of one series of similar optical prisms 1 and another series of similar optical prisms 5. Each prism 1 has an entrance face 10, a totally reflective surface 2 and an emergent or exit face 6. Each prism 5 has an entrance face 9, a totally reflective surface 4, and an emergent or exit face 11. Prisms 1 and 5 have the same refractive index. The entrance faces 10 of prisms 1 and the exit faces 11 of prisms 5 are parallel and the angle between the entrance face 10 and the totally reflective surface 2 of each prism 1 is the same as the angle between the exit face 11 and the totally reflective surface 4 of each prism 5. The totally reflective surface 2 of prism 1 is separated fom the totally reflective surface 4 of prism 5 by a transparent lamina 3, e. g. of air or the like, having an index of refraction less than that of the prisms. The exit face 6 of prism 1 and the entrance face 9 of prism 5 are separated by an optical double layer composed of a light absorbing filter 7 and a lamina 8 of low refractive index similar to lamina 3.

Bundles of light rays, indicated by representative rays $a$—$a$, $b$—$b$, $b_1$—$b_1$ and $c$—$c$, emanating from the objects and light sources in the field of vision enter the entrance face 10 of each prism 1, pass through these prisms, then through prisms 5 and emerge from the exit faces 11 of the latter prisms. It is assumed that the rays coming from the right, such as $c$—$c$, are emitted by objects in the driver's lane and to the right thereof, while the rays coming from the left, such as $b$—$b$ and $b_1$—$b_1$, emanate from the approaching headlights in the opposite lane.

The mechanism of separation and selective attenuation can be explained with reference to the four selected rays $a$—$a$, $b$—$b$, $b_1$—$b_1$ and $c$—$c$. The rays $a$—$a$ of the bundle of entering light rays strike the entrance face 10 and the totally reflective surface 2 of each prism 1 at the critical angle of refraction, and are consequently so refracted as to graze face 2 without entering prism 5. The rays $c$—$c$ coming from the right and having angles of incidence less than the critical angle are almost completely transmitted through the totally reflective surface 2 and enter the lamina 3. Because of the difference in the refractive indices of prism 1 and lamina 3, the rays $c$—$c$ are diffracted to the right. The diffracted rays enter prism 5 through face 4 and their previous direction through prism 1 is restored by passage through this face. The rays finally emerge from the exit face 11 of the latter prism in their original direction of incidence with almost no loss of intensity. The small fraction of the rays $c$—$c$ which is reflected at surface 2 is further reduced in intensity by the filter 7 so that only a minor portion of these reflected rays enter prism 5 to the right. The rays $b$—$b$ coming from the left and having angles of incidence greater than the critical angle are totally reflected at the totally reflective surface 2 of each prism 1, pass through the optical double layer including the light filter 7 and the lamina 8, enter the prism 5 to the right, and upon striking the totally reflective surface 4 of the latter prism are again totally reflected, thereby restoring their original direction through prism 1, and emerge from the exit face 11 in their original direction of incidence.

Since the rays $c$—$c$ coming from the right pass through the optical device with almost no loss of intensity, whereas the rays coming from the left are strongly attenuated, the desired effect is obtained.

Experiments have shown that it is not desirable to suppress completely the rays coming from the headlights of oncoming cars; therefore the absorption of filter 7 is chosen to be less than 100%. For example, it may be 90%, thus transmitting 10% of the rays passing through it.

A small fraction of the rays coming from the left does not directly strike the totally reflective surface 2 after having entered prism 1. Such rays $b_1$—$b_1$ directly impinge upon the exit face 6 of prism 1 and pass through filter 7, but do not emerge therefrom because the right surface of filter 7 constitutes a totally reflective surface due to the presence of the lamina 8 of low refractive index. Instead of emerging from filter 7 and passing through prism 5 into the eye of the driver, these rays are totally reflected at the interface 12 between the filter and lamina 8, traverse filter 7 a second time in the opposite direction and thence pass through prisms 1 and 5, emerging from face 11 in a direction inclined to the left. Because of having passed twice through filter 7, the rays $b_1$—$b_1$ no longer possess any noticeable intensity compared to the other rays emerging from the optical device. Assuming a reduction to 10% for a single traverse of filter 7, the double traverse reduces the intensity to 1%.

Without the transparent lamina 8, the rays $b_1$—$b_1$ would emerge from filter 7, travel through prism 5, and emerge from face 11 in their original direction. Their intensity would be substantially that of ray $b$—$b$ coming from the same light source, but their point of exit would be to the left of rays $b$—$b$. Since their point of entrance is to the right of rays $b$—$b$, the result would thus be a displaced double image of the light source. Though it is very desirable to be able to observe the oncoming headlights with their intensity reduced to a low level, it is highly undesirable and disturbing to see four headlights instead of two. Hence it is readily apparent that the interposition of the optical double layer including filter 7 and lamina 8, between the exit face 6 of prism 1 and the entrance face 9 of prism 5 is an important feature of the invention.

Figure 2:
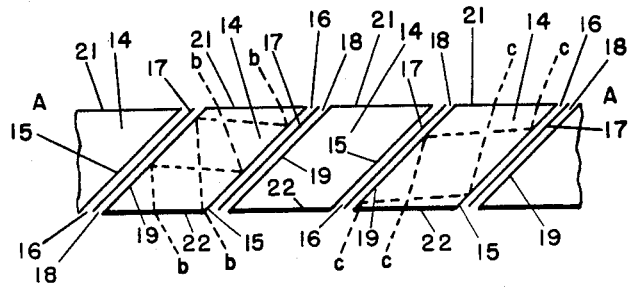
Fig. 2 is a schematic illustration of another embodiment of the invention.

Referring to Fig. 2 of the drawing, representing another embodiment of the invention, a pane or composite series of optical elements A—A is shown composed of a quantity of small prism elements 14. Each of the prism elements has two parallel totally reflective surfaces or faces 15 and 19, and the adjacent faces 15 and 19 of adjacent prisms are separated by two optical double layers 16—17 and 17—18. 16 and 18 are transparent laminae, and 17 is a light absorbing filter. Hence these adjacent optical double layers have a common filter. The entrance faces 21 of prisms 14 are parallel to the emergent or exit faces 22 of the prisms.

Rays entering the entrance face 21 of each prism are reflected by faces 15 and 19, and emerge from the exit face 22. The rays $c$—$c$ coming from the right are totally reflected at the totally reflective surface 15, thereby changing their direction, traverse prism 14 and upon striking the second totally reflective surface 19 are again totally reflected, thus restoring their direction prior to the first reflection. The rays finally emerge from exit face 22 in their original direction of incidence. Rays $b$—$b$ coming from the left are partially transmitted and partially reflected by the surface 15 since their angle of incidence is less than the critical angle. The transmitted portion of such rays traverses lamina 16 and is then completely absorbed by filter 17. The reflected portion of rays $b$—$b$ traverses the prism 14 and strikes the second surface 19 where they are again partially transmitted and partially reflected. The transmitted rays are absorbed by filter 17 and the direction of the reflected rays is restored to their direction prior to the first reflection. These reflected rays emerge from the exit face in their original direction of incidence. Because the rays $c$—$c$ are twice totally reflected, their intensity is practically unchanged, whereas the intensity of rays $b$—$b$ which were twice only partially reflected is greatly reduced.

Figure 3:
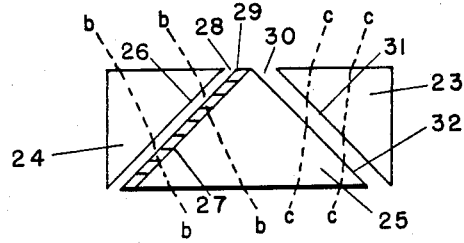
Fig. 3 is a schematic illustration of a third embodiment of the invention.

In Fig. 3 is shown a combination, in accordance with the invention, comprising three prisms 23, 24 and 25. An optical double layer composed of a transparent lamina 28 of low refractive index and a light absorbing filter 29, is interposed between prisms 24 and 25 with lamina 28 in contact with face 26 of prism 24 and the filter 29 in contact with face 27 of prism 25. A transparent lamina 30 of low refractive index is disposed between face 31 of prism 23 and face 32 of prism 25.

By means of the foregoing embodiment rays coming from the right can pass through prism 25 only by passage first through the right prism 23 and rays coming from the left only by transmission initially through the left prism 24, even though the rays emanating from both directions strike each of prisms 23 and 24. Thus rays b—b emanating from a source to the left are transmitted through prism 24, thence through the optical double layer consisting of a lamina 28 and filter 29 and through prism 25, and finally emerge from prism 25 with their original angle of incidence. However these rays are reduced in intensity by passage through filter 29. On the other hand, any rays b—b which strike and pass through prism 23 are totally reflected at face 31 because the angle of incidence of such rays is greater than the critical angle and hence they do not enter prism 25.

With respect to rays such as c—c coming from the right, these rays strike prism 23, are transmitted through it, transparent lamina 30 and prism 25, and emerge from prism 25 with their original angle of incidence and of substantially the same intensity as the original rays. Any rays c—c striking prism 24 pass through this prism and are totally reflected at surface 26 because their angle of incidence is greater than the critical angle; hence these rays do not enter prism 25. It is thus apparent in accordance with the embodiment of Fig. 3, that glare rays coming from the left are reduced in intensity, whereas rays coming from the right are transmitted practially undiminished in intensity.

Figure 4:
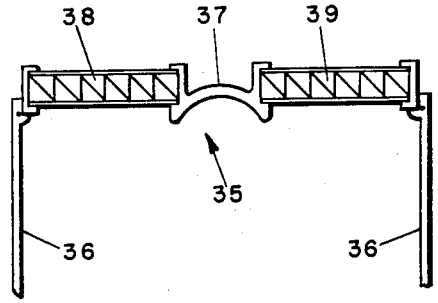
Fig. 4 is a horizontal cross sectional schematic view of spectacles containing the optical device of Fig. 1.
Figure 5:
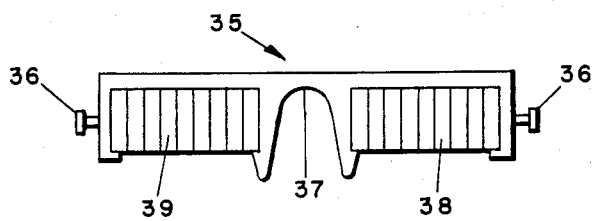
Fig. 5 is the front view of the spectacles of Fig. 4.

Figs. 4 and 5 of the drawing are directed to spectacles or eye glasses employing optical systems in accordance with the principles of the invention. Such spectacles include a frame 35 having temple pieces 36 and a nose piece 37. Mounted in the spectacle frame are a pair of co-planar transparent plates 38 and 39. Each of these plates is composed of a series of juxtaposed optical elements of the type shown in Fig. 1. When the spectacles are worn by the driver of an automobile at night, glare rays emanating from approaching headlights at the left are attenuated while light rays directly in front and to the right of the driver are permitted to pass through eye pieces 38 and 39 practically undiminished in intensity. As seen particularly in Fig. 5, the lower rim of the spectacle frame is eliminated and the temple pieces 36 are mounted comparatively low so that when the spectacles are worn, the pupil of the eye is normally located just below the lenses or eye pieces 38 and 39. This enables a driver to wear the spectacles while still allowing him to observe the road directly without looking through the glasses. In the event of the presence of glare rays the wearer may adjust the spectacles merely by a slight tilting of the head to such a position that the glare disappears. In this manner maximum protection and safety with minimum irritation to the eyes is achieved.

Figure 6:
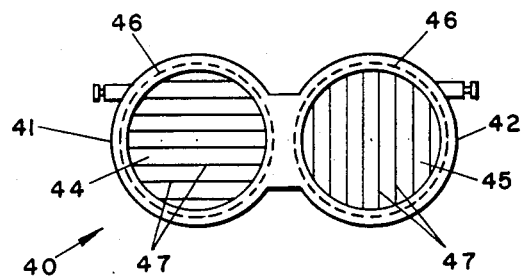
Fig. 6 is another type of spectacles embodying the optical device of Fig. 1.

Fig. 6 represents another type of spectacles also embodying the optical device described in Fig. 1. In this embodiment the eye glass frame 40 is constructed with circular lens holders 41 and 42, each having an annular groove 46 therein. Optical lenses 44 and 45 composed of a series of juxtaposed optical elements as shown in Fig. 1 and circular in shape are mounted in the grooves 46 of the lense holders. The lenses or eye pieces 44 and 45 may be rotated in the grooves of the lens holders in any suitable manner so that the prism elements 47 of the eye pieces may be shifted to any angle from the horizontal, corresponding to the position of the prism elements in the left eye piece of Fig. 6, to the vertical, the position of the prism elements in the right eye piece of Fig. 6. By means of this embodiment the spectacles may be worn for night driving to eliminate glare from oncoming headlights by rotating both lenses to the position shown by the right eye piece of Fig. 6, or the spectacles may be used to eliminate glare from a low sun by rotating the lenses to the position shown by the left eye piece of Fig. 6.

Figure 7:
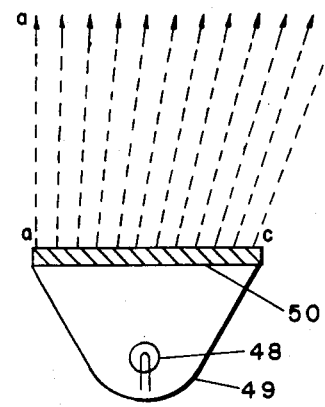
Fig. 7 is a cross section of an auto headlight embodying the optical device of Fig. 1.

Fig. 7 of the drawing relates to a modification of an ordinary automobile headlamp involving the use of a lens based on the invention principles. In this embodiment 48 is an electric light bulb, 49 is a parabolic reflector and 50 represents a pane-type glare protector lens composed of a series of juxtaposed prism elements of the type shown in Fig. 1. Light rays reflected from the parabolic reflector 49 and from the headlamp to the left thereof are diminished in intensity whereas light rays a—a and c—c emitted from the light source and proceeding in a direction in front of and to the right of the lens are transmitted therethrough with practically no diminution of intensity. This enables the driver to see objects in front and to the right of his vehicle without blinding the driver of an approaching car in the opposite lane of the road. Hence, the driver of a car equipped with such a device need not dim his lights because of approaching cars.

Figure 8:
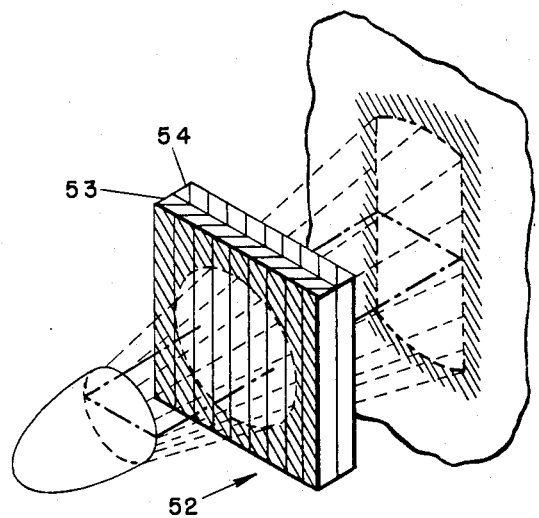
Fig. 8 represents another modification of the invention device.

Although the foregoing description has been concerned mostly with the application of the invention principles to glare protectors, the invention is equally applicable for the provision of any optical devices affording a sharp demarkation between light rays of different angles. For example, according to Fig. 8 of the drawing, a device 52 is provided for controlling the intensity of light rays in a lateral direction by combining two co-planar optical elements 53 and 54, each made up of a series of prism elements in accordance with the embodiment shown in Fig. 2. The optical elements 53 and 54 are arranged in contact with each other, as seen in the drawing, so that one of these elements limits the left side of the beam of light while the other limits the right side of the beam, thus controlling the angular distribution of the visibility of illumination in a horizontal direction. If desired, the device of Fig. 8 may be modified to also limit the intensity of the light beam in a vertical direction by providing a second combination of prism elements 53 and 54 in planar contact with the above first combination thereof but rotated at an angle of 90° thereto, so that the prism elements in the respective combinations are positioned perpendicular to each other. A device of the latter type may be utilized to focus or sharpen the beam of a searchlight.

As additional applications of the invention device, the latter may be attached to or incorporated as an integral part of the windshield of an automobile or vehicle to protect the driver thereof from glare rays, or the invention device may be positioned in front of the driver in any other suitable manner, e. g., by attachment to the conventional auto visor, for this purpose.

The transparent laminae employed in the invention device may include any media having a refractive index smaller than that of the prisms and larger than that of air. It is also to be understood that the prisms in the invention device may be constructed of materials other than glass. Further, the invention principles are not limited to a half and half division of the field of vision, but may also be utilized to divide the field of vision into more than two parts.

It is apparent from the foregoing that the invention provides a simple optical device for attenuating or substantially eliminating unwanted light rays of one direction while allowing the passage in practically undiminished intensity of desired light rays from a different direction, the device being particularly useful in the form of a glare protector for night operation of an automobile to eliminate glare from headlights of cars approaching in the opposite lane while allowing practically undiminished and unobstructed vision of the highway in the driver's own lane and to his right. Moreover, the glare protection devices hereof may be readily adjusted in a manner to prevent blinding of the driver by a rising or setting sun close to the horizon.

A comparison of the glare protector according to the invention with devices utilizing polarized light further points out the advantages of the invention. In the first place, the operator of an automobile may protect himself from oncoming headlight glare by means of the invention device regardless of whether the approaching car is also equipped with the invention device. Further, the intensity of illumination and the visibility within the driver's own lane are not decreased as in the case of the use of devices employing polarized light, thus eliminating the necessity for the use of stronger light bulbs and power sources. Hence it is apparent that the invention device increases the safety of night driving by providing better vision for the driver and by reducing the strain on his eyes resulting from blinding headlights.

Obviously many modifications and variations of the present invention are possible in the light of the above teachings. It is therefore to be understood that within the scope of the appended claims the invention may be practiced otherwise than as specifically described.

I claim:

1. An angular discriminating optical device comprising a first transparent prism having an entrance face, a second face and a third face, said second face being disposed at an acute angle to the entrance face such that a portion of the light rays entering the entrance face is totally reflected and a portion of said rays is transmitted by said second face depending on their angles of incidence, a second transparent prism having an entrance face and an emergent face, said entrance face of said second prism being parallel to said third face of said first prism, said emergent face of said second prism being parallel to the entrance face of said first prism, an optical double layer disposed between said third face of said first prism and the entrance face of said second prism, said double layer consisting of a light filter in contact with said third face of said first prism and a transparent lamina having an index of refraction less than that of said first transparent prism adjacent to and in continuous contact with said filter and said last mentioned entrance face, a third transparent prism having an entrance face parallel to said second face of said first prism and an emergent face parallel to the entrance face of said first prism and in the same plane as the emergent face of said second prism, a second transparent lamina of low index of refraction interposed between said second face of said first prism and the entrance face of said third prism, said second transparent lamina consisting of a medium having an index of refraction less than that of said prisms, and wherein said optical double layer is disposed substantially normal to the entrance face of said first prism.

2. An optical device comprising a composite series of juxtaposed elements as defined in claim 1, with the entrance faces of said first prisms disposed in a common plane and with the emergent faces of said second and third prisms in a common plane parallel to and spaced from said first plane.

References Cited in the file of this patent

UNITED STATES PATENTS

| 1,458,635 | Whitney | June 12, 1923 |

FOREIGN PATENTS

| 429,340 | Great Britain | May 27, 1935 |
| 458,509 | Great Britain | Dec. 14, 1936 |